United States Patent Office.

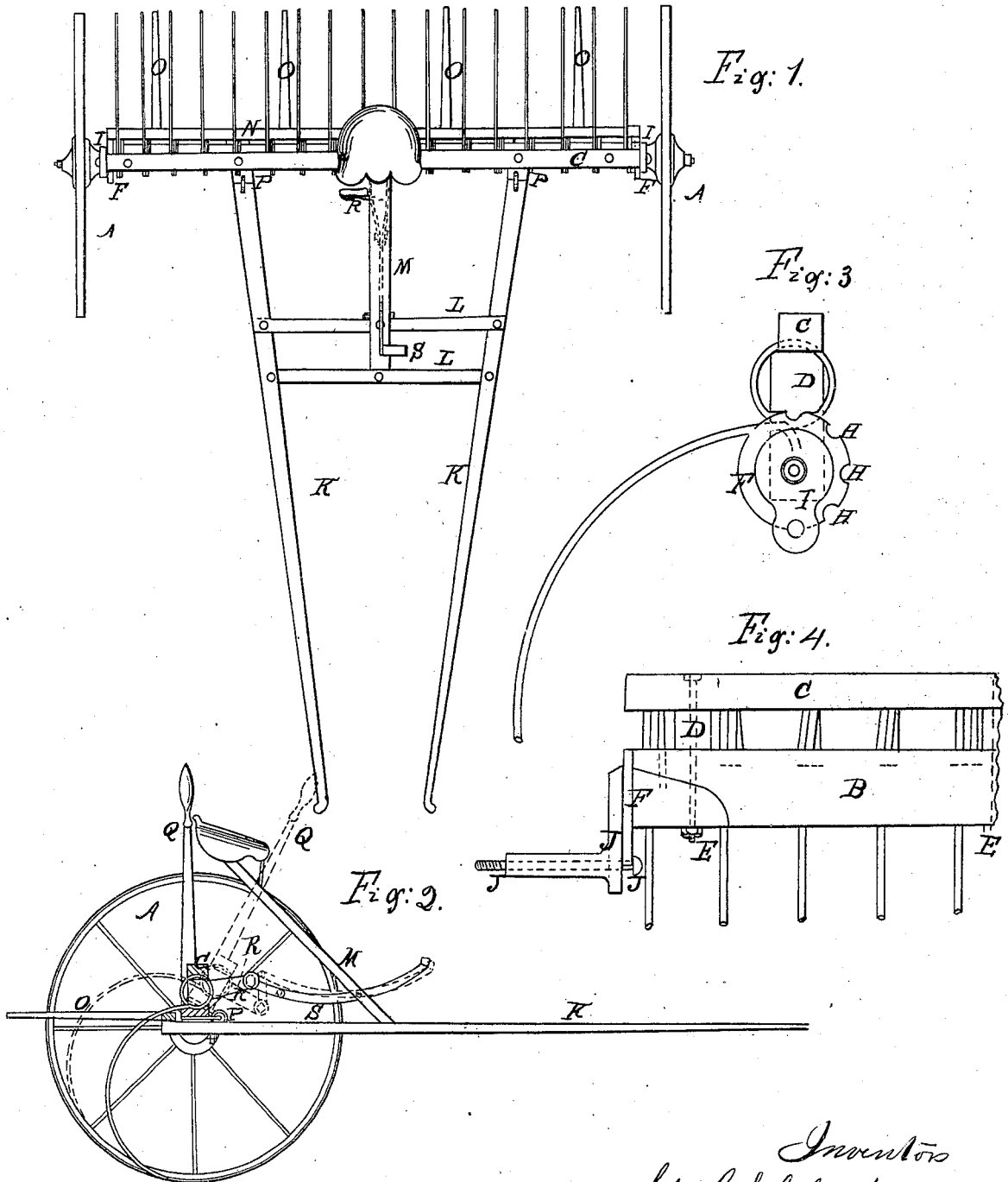

SILAS C. SCHOFIELD AND A. JUDSON WISE, OF CHICAGO, ASSIGNORS TO SILAS C. SCHOFIELD AND WILLIAM D. ANDRUS, OF ROCKFORD, ILLINOIS.

Letters Patent No. 96,272, dated October 26, 1869.

IMPROVEMENT IN HORSE-RAKES.

The Schedule referred to in these Letters Patent and making part of the same.

*To all whom it may concern:*

Be it known that we, SILAS C. SCHOFIELD and A. JUDSON WISE, of Chicago, in the county of Cook, and State of Illinois, have invented a new and useful Improvement in Horse-Rakes; and we do hereby declare the following to be a full, clear, and exact description of the same, reference being had to the accompanying drawings, and the letters and figures marked thereon, which form a part of this specification, and in which—

Figure 1 represents a top or plan view of the rake;
Figure 2, a transverse vertical sectional view;
Figure 3, an end elevation of the axle and cap; and
Figure 4, a side elevation of a portion of the same.

The nature of our invention consists in the special device shown and described, for securing the teeth to the rake; and also, in the special device used in attaching the wheels to the rake.

To enable those skilled in the art to understand how to manufacture and use our invention, we will proceed to describe the same with particularity.

The same letters of reference refer to the corresponding parts in the different figures.

Our rake is a sulky-rake, A being the ordinary wheels used on sulky-rakes, and B is the axle, which also serves as the rake-head or the cross-piece, to which the teeth are attached.

There are transverse notches cut in this piece B, as shown in fig. 2, and indicated by dotted lines in figs. 3 and 4, in which the coil part of the rake-tooth is placed, the end of the rake-teeth being bent, so as to extend perpendicularly into the said axle, as indicated. These transverse notches are as wide as the coil of the tooth.

There is also a cap-piece, C, in which there are similar transverse notches, for the coil of the teeth.

This cap-piece is held in place by the blocks D and bolts E.

By this method of securing the rake-teeth, the coil is kept from spreading, by each side of the coil resting in notches just wide enough to receive them, and, at the same time, there is nothing in the coil to prevent it from giving all the spring there is in the metal, just as much as if the tooth had no fastening.

There are plates F attached to the ends of the axle B, in the circumference of which there are notches H, and there are also crank-axles I attached to the axle B, through the spindle of which the bolt J passes, one end of the bolt resting in one of the notches in the plate F, the nuts, which secure the wheels A, being screwed to the other end thereof.

By placing the bolts J in different notches H in the plate F, the height of the axle B is regulated.

K represents the thills, and L, cross-pieces, to which the seat-support M is attached.

There is a cross-piece, N, attached to the rear end of the thills, and O are guards, extending out from the cross-piece N, to clear the rake-teeth of hay, when they are elevated, as hereafter described.

The axle B is hinged to the thills by the hinges P P, and is turned on said hinges, to raise the teeth, to discharge the windrow of hay.

Q is a lever, attached to the axle, and extending up near the driver's seat, for the purpose of turning the axle, to raise the teeth, and there is also a treadle-lever, R, attached to said axle, whereby the operator can turn the axle on its hinges, and discharge the hay from the rake with his foot.

There is also a treadle-lever, S, which has its bearing in the seat-support M, and which is attached to the end of the treadle-lever R.

There is a joint, T, in the treadle-lever S, which, when the rake is thrown into the position indicated by the blue lines in fig. 2, can be made to assume the position also shown for it by the blue lines, when it locks the rake in that position, with the rake-teeth raised from the ground, when the sulky can be readily driven from or to the field.

But the principal object of the treadle S is to enable the operator to press the rake-teeth to the ground with his foot. By placing his foot upon the treadle S, he presses the rake-teeth to the ground, and by placing it upon the treadle R, he can raise the teeth from the ground, to discharge the hay.

Having thus fully described the construction and operation of our invention,

What we claim, and desire to secure by Letters Patent, is—

1. The transverse slots or notches in the axle B, and cap C, in combination with the coil of the rake-tooth, for the purposes of securing the rake-teeth, substantially as and for the purposes specified.

2. The combination of the plates F, provided with the notches H, the crank-axle I, and bolt J, when constructed and arranged substantially as and for the purposes specified.

SILAS C. SCHOFIELD.
A. JUDSON WISE.

Witnesses:
J. L. COBURN,
L. L. COBURN.